United States Patent
Kim et al.

(10) Patent No.: US 8,117,365 B2
(45) Date of Patent: Feb. 14, 2012

(54) METHOD AND APPARATUS FOR COMMUNICATION BETWEEN UNIVERSAL SERIAL BUS (USB) HOST AND USB DEVICE

(75) Inventors: Min-soo Kim, Seoul (KR);
Hyeong-seok Kim, Seongnam-si (KR);
Jung-wook Kim, Hwaseong-si (KR);
Ji-young Kong, Suwon-si (KR);
Kyung-wook Ye, Seoul (KR); Jong-woo Chae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 70 days.

(21) Appl. No.: 11/852,569

(22) Filed: Sep. 10, 2007

(65) Prior Publication Data
US 2008/0162756 A1 Jul. 3, 2008

(30) Foreign Application Priority Data

Dec. 27, 2006 (KR) ........................ 10-2006-0134985

(51) Int. Cl.
*G06F 13/00* (2006.01)
*G06F 13/40* (2006.01)
*G06F 13/42* (2006.01)

(52) U.S. Cl. ................ 710/106; 710/306; 710/315

(58) Field of Classification Search .................. 710/106, 710/306, 315
See application file for complete search history.

(56) References Cited

U.S. PATENT DOCUMENTS

| | | | |
|---|---|---|---|
| 6,697,372 B1 * | 2/2004 | McAlear | 370/402 |
| 7,213,096 B2 * | 5/2007 | Keys et al | 710/313 |
| 2005/0223119 A1 | 10/2005 | Keys et al. | |
| 2005/0228933 A1 | 10/2005 | Tsai | |

OTHER PUBLICATIONS

Korean Office Action issued on Mar. 7, 2011, in corresponding Korean Patent Application No. 10-2006-0134985 (6 pages with translation).
Chinese Office Action issued on Sep. 14, 2011, in corresponding Chinese Patent Application No. 200710163044.6 (with English translation).

\* cited by examiner

*Primary Examiner* — Mark Rinehart
*Assistant Examiner* — Jeremy S Cerullo
(74) *Attorney, Agent, or Firm* — NSIP Law

(57) ABSTRACT

A method of interfacing between a universal serial bus (USB) host and a USB device. The USB host and the USB device include modules to process packets according to network protocols, instead of USB bus interfaces. Therefore, the USB device can be connected to the USB host even without a USB cable, and thus is not affected by the distance between the USB host and USB device.

28 Claims, 5 Drawing Sheets

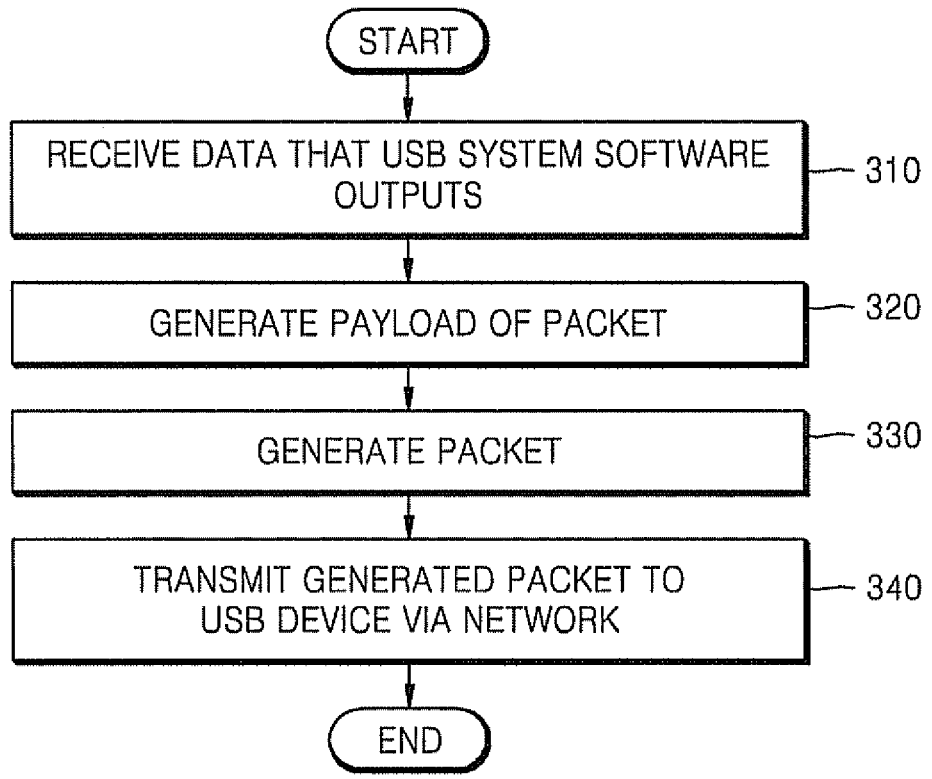
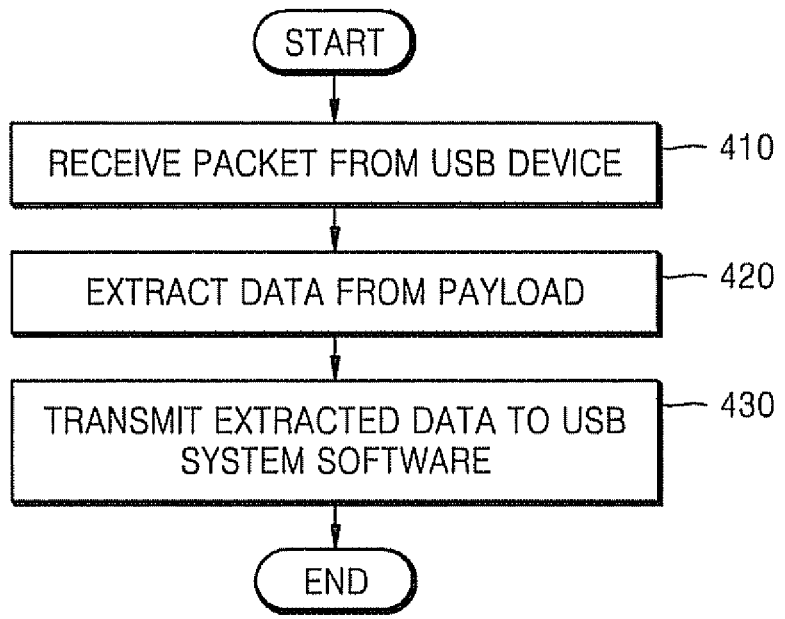

METHOD AND APPARATUS FOR COMMUNICATION BETWEEN UNIVERSAL SERIAL BUS (USB) HOST AND USB DEVICE

CROSS-REFERENCE TO RELATED APPLICATION

This application claims the benefit of Korean Application No. 2006-134985, filed in the Korean Intellectual Property Office on Dec. 27, 2006, the disclosure of which is incorporated herein by reference.

BACKGROUND OF THE INVENTION

1. Field of the Invention

Aspects of the present invention relate to a universal serial bus (USB) communicating method and, more particularly, to an interface between a USB host and USB device.

2. Description of the Related Art

The universal serial bus (USB) is a serial port developed to standardize an interface for connecting computer peripherals to a computer. Examples of computer peripherals include mice, keyboards, printers, modems, or speakers. USB makes installation and removal of a device easy and fast, and is therefore widely used as current PC standard equipment.

FIG. 1 is a block diagram illustrating a general USB communication method. A general USB system includes a USB host and a USB device. The USB host (hereinafter referred to as a host) is generally a PC, and the USB device (hereinafter, referred to as a device) is generally a peripheral device having a USB interface. The host includes client software (SW), USB System SW, and a USB bus interface. The device includes a Function, a USB logical device, and a USB bus interface. The Function is a collection of interfaces that each provide functionality for the USB device. The host and the device are connected to each other via a USB cable.

The client SW is a part of the USB host that actually uses the Function of the USB device. The flow of all data generated by the client SW to use the Function of the USB device will now be described. The data that the client SW generates to use the Function of the USB device is transmitted to the USB bus interface of the device via the system SW, a host controller, and a USB cable. The data is transmitted from the USB Bus Interface to the Function via the USB logical device. The Function of the USB device processes the data transmitted by the client SW of the USB host. Data that the Function of the USB device transmits to the client SW of the USB host flows in the order opposite to that of the data transmitted by the client SW.

The USB device may belong to a specific USB class according to the type of function that the USB device provides. For example, the USB device may belong to a printer class, a mass storage device class, or a Human Interface Device (HID) class. The substance and form of data transmitted between the client SW of the USB host and the Function of the USB device depend on the type of USB class to which the USB device belongs, and are defined in the USB class specification. The client SW and the USB System SW, which exists in a level lower than the client SW, exchange the data defined in the USB class specification. Similarly, the Function and the USB logical device, which are included in the USB device, exchange the data defined in the USB class specification. The data is physically transmitted via the USB cable. However, in a logical sense, the data is transmitted and received between the client SW of the USB host and the Function of the USB device. A path taken by this transmission is referred to as a pipe, and an end of the pipe in the USB device is referred to as an endpoint.

When the USB device is connected to the USB host via the USB cable, enumeration occurs. Enumeration is a process in which the USB host determines the type and number of endpoints of the USB device, the type of a product (for example, a peripheral device), and the like. In this process, the host allocates addresses to the device and receives a device descriptor and a configuration descriptor from the device in order to prepare for transmission and reception of data. This process is performed during transmission and reception of data between the USB system SW of the USB host and the USB logical device (i.e., an endpoint 0) of the USB device. The data transmitted and received in this process is referred to as setup data. A logical transmission path for transmitting and receiving the setup data is referred to as a default pipe.

Consequently, the data transmitted and received between the client S/W of the USB host and the function of the USB device and the setup data transmitted and received between the USB system SW of the USB host and the USB logical device is logically transmitted via the pipe, but physically transmitted via the USB cable. Due to a physical limitation of the USB cable, the USB host and the USB device can communicate with each other when both are within about 5 meters of each other. Hence, a user should only use a device that is adjacent to a host.

SUMMARY OF THE INVENTION

Aspects of the present invention provide a method and apparatus for performing transmission and reception of data between a universal serial bus (USB) host and a USB device without a limit to a distance between the USB host and the USB device.

According to an aspect of the present invention, a method in which a USB (universal serial bus) host communicates with a USB device is provided. The method comprises generating a packet having a format that is used in a network other than a USB network, using data output by USB system software; and transmitting the generated packet to the USB device via the network.

According to another aspect of the present invention, the data may be at least one of setup data or data transmitted by client software of the USB host to a Function of the USB device.

According to another aspect of the present invention, the packet may be at least one of information about a transmission type, an address of an endpoint, information about a transmission direction, or a device address.

According to another aspect of the present invention, the data comprises at least one of information indicating that the USB host is in a suspended state or information used to reset the USB device.

According to another aspect of the present invention, the network may be at least one of a wireless LAN, an Ethernet, and a token ring.

According to another aspect of the present invention, a computer readable recording medium is provided. The computer readable recording medium has recorded thereon a program to execute the above-described communication method.

According to another aspect of the present invention, a method in which a USB host communicates with a USB device is provided. The method comprises receiving a packet that is used in a network other than a USB network, from a USB device via the network; extracting data recognizable to USB system software from the received packet; and transmitting the extracted data to the USB system software.

According to another aspect of the present invention, a USB host to communicate with a USB device is provided. The USB host comprises a network protocol unit to transmit and receive a packet to and from a USB device via a network other than a USB network; and a host interface unit to generate a payload of a packet to be transmitted by the network protocol unit, using data output by USB system software, to extract data recognizable to the USB system software from the payload of the packet received by the network protocol unit, and to transmit the extract data to the USB system software.

According to another aspect of the invention, the data is at least one of setup data or data transmitted and received between client software of the USB host and a function of the USB device.

According to another aspect of the present invention, a method in which a USB device communicates with a USB host is provided. The method comprises generating a packet having a format that is used in a network other than a USB network, using data output by a USB logical device; and transmitting the generated packet to the USB host via the network.

According to another aspect of the present invention, a method in which a USB device communicates with a USB host is provided. The method comprises receiving a packet that is used in a network other than a USB network, from the USB host via the network; extracting data recognizable to a USB logical device from the received packet; and transmitting the extracted data to the USB logical device.

According to another aspect of the present invention a USB device to communicate with a USB host is provided. The USB device comprises a network protocol unit to transmit and receive a packet to and from the USB host via a network; and a host interface unit to generate a payload of a packet to be transmitted by the network protocol unit, using data output by a USB logical device, to extract data recognizable to the USB logical device from the payload of the packet received by the network protocol unit, and to transmit the extracted data to the USB logical device.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 3 is a flowchart of a process in which a USB host transmits data to a USB device, according to an embodiment of the present invention;

FIG. 4 is a flowchart of a process in which a USB host receives data from a USB device, according to an embodiment of the present invention;

DETAILED DESCRIPTION OF THE EMBODIMENTS

Figure 1:
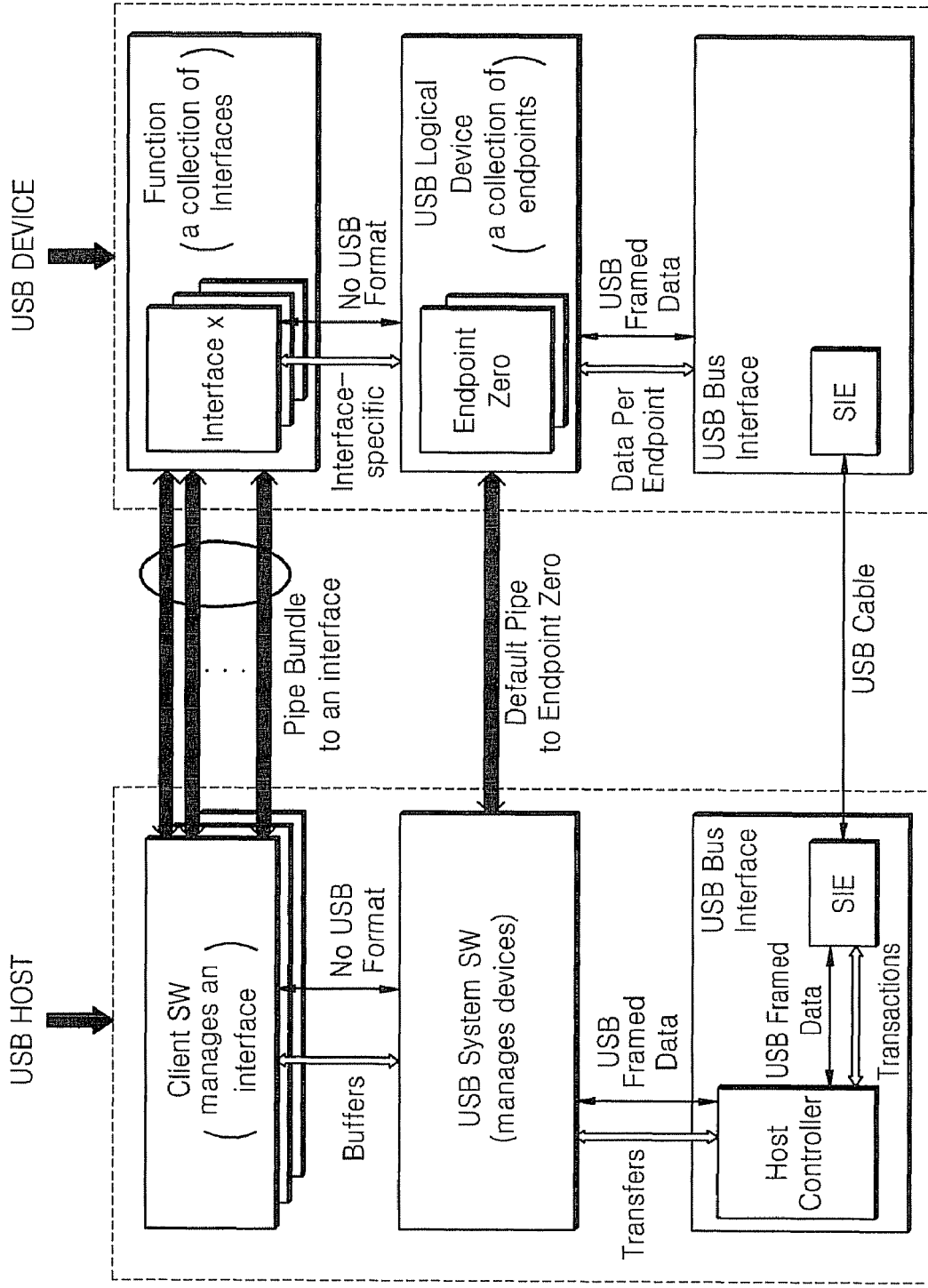
FIG. 1 is a block diagram illustrating a general USB communication method.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
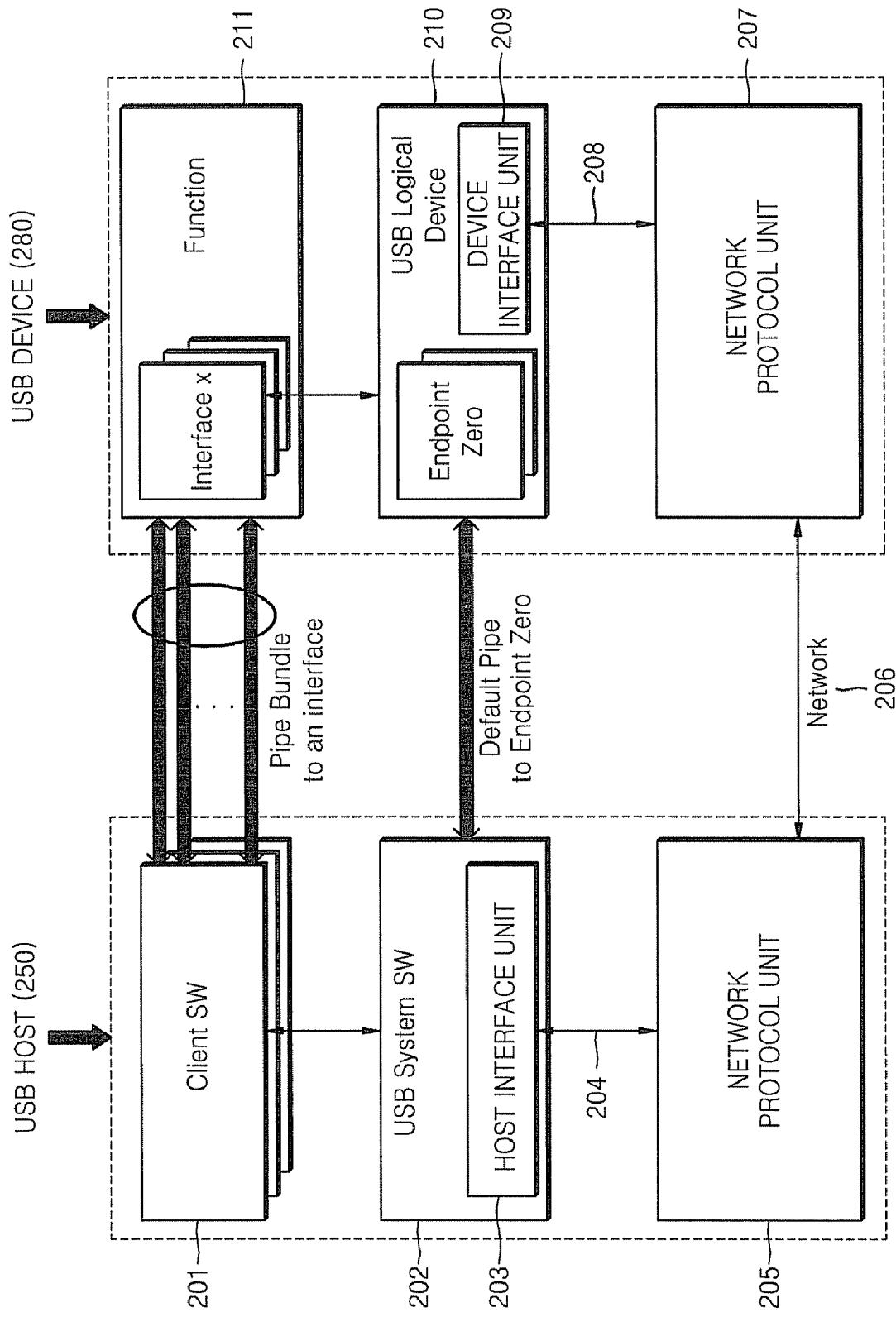
FIG. 2 is a block diagram of structures of a USB host and a USB device according to an embodiment of the present invention.

FIG. 2 is a block diagram of structures of a universal serial bus (USB) host 250 and a USB device 280 according to an embodiment of the present invention. The USB host 250 and the USB device 280 need not include any USB bus interfaces. The USB host 250 and the USB device 280 instead communicate with each other via a network 206 instead of a USB cable.

The USB host 250 includes a host interface unit 203 and a network protocol unit 205. The host interface unit 203 receives data transmitted by a client SW 201 of the USB host 250 to a function 211 of the USB device 280, receives data (i.e., setup data) transmitted by USB system SW 202 to a USB logical device 210 of the USB device 280 from the USB system SW 202, and generates a payload of a network packet.

Generally, USB traffic, in which data transmission and reception are conducted between a host and a device in a USB system, includes specific information. This information is referred to by the client SW 201, the USB system SW 202, the function 211, and a logical device 210. Examples of the information include information about a transmission type, the address of an endpoint, information about a transmission direction, an address of a device, etc. Examples of transmission type include a bulk type, an isochronous type, an interrupt type, and a control type. Examples of transmission direction include an inward direction and an outward direction. The details thereof are described in the USB specification, so a detailed description will be omitted.

According to conventional art, a host controller included in a host inserts the above-described information when generating a packet having a format of transmission that uses a USB cable (hereinafter, a link layer format) using the data received from USB system software. However, the USB host 250 according to an embodiment of the present invention need not include any host controllers, and thus the host interface unit 203 plays the role of the host controller. The payload of the network packet generated by the host interface unit 203 includes information about a transmission type, the address of an endpoint, information about a transmission direction, an address of a device, etc.

The host interface unit 203 may also play the role of a root hub. A root hub is originally included in a host controller and transmits a signal, such as a suspend signal or a port reset signal, to a device using an electrical signal. A suspend signal indicates that a host is suspended. A port reset signal is used to reset a device. The USB host 250 need not include any host controllers and is thus unable to transmit the suspend signal or the port reset signal to the USB device 280 using an electrical signal. Accordingly, the host interface unit 203 generates a payload of a network packet corresponding to the suspend signal or port reset signal. A packet including this payload will be interpreted by a device interface unit 209 of the USB device 280. Additionally, the host interface unit 203 extracts data recognizable to the USB system software 202 from the payload of the packet received from the USB device 280 and transmits the extracted data to the USB system software 202. The extracted data is at least one of setup data or data that is transmitted and received between the client software 201 and the function 211. "At least one of" is used herein in an inclusive sense; thus, the extracted data may be setup data, data transmitted/received between the client software 201 and the function 211, or both setup data and data transmitted/received.

The client software 201, the USB system software 202, the function 211, and the USB logical device 210 are the same as those in a conventional USB system and accordingly may not interpret the payload format of the network. For this reason, the host interface unit 203 extracts necessary data from the packet and transmits the extracted data to the USB system software 202. The USB system software 202 communicates with the host interface unit 203 in the same manner as conventional USB system software communicates with a host controller. The payload of the network packet received by the host interface 203 from the network protocol unit 205 may further include information indicating a success or failure of reception of a previous packet by the USB host 250, in addition to information about a transmission type, the address of an endpoint, information about a transmission direction, an address of a device, etc.

The network protocol unit 205 generates a packet that is to be used in the network 206 using the payload generated by the host interface unit 203, and transmits the packet to the USB device 280 via the network 206. The network 206 may be at least one of a wireless LAN, an Ethernet, a token ring, or the like. The network protocol unit 205 transmits the packet using an appropriate protocol according to the type of the network 206, such as the Internet Protocol (IP), the Internetwork Packet Exchange (IPX) protocol, or the X.25 protocol.

The USB device 280 includes the device interface unit 209 and a network protocol unit 207. The device interface unit 209 generates a payload of a packet to be transmitted by the network protocol unit 207 using data that the USB logical device 210 transmits to the USB bus interface, extracts data recognizable to the USB logical device 210 from the payload of the packet received by the network protocol unit 207, and transmits the extracted data to the logical device 209. Similar to the host interface unit 203, data transmitted and received between the device interface unit 209 and the USB logical device 210 is at least one of setup data, data that is transmitted and received between the client software 201 and the function 211, or data corresponding to a suspend signal or a port reset signal.

The payload of the network packet that is processed by the device interface unit 209 includes information about a transmission type, the address of an endpoint, information about a transmission direction, an address of a device, etc. The payload of a packet to be transmitted to the USB host 250 may further include information indicating a success or failure of reception of a previous packet by the USB host 250, in addition to the aforementioned information.

The network protocol unit 207 performs the same function as that of the network protocol unit 205 of the USB host 250. The network protocol 207 generates a network packet using the payload generated by the device interface unit 209 and transmits the network package to the USB host 250 via the network 206. Additionally, the network protocol 207 generates a network packet from the USB host 250 and transmits the payload of the network packet to the device interface unit 209.

The host interface unit 203 and the device interface unit 209 may be implemented as either hardware or software. FIG. 3 is a flowchart of a process in which the USB host 250 transmits data to the USB device 280, according to an embodiment of the present invention. Although the process shown in FIG. 3 is described with respect to the USB host 250 and the USB host 280 shown in FIG. 2, other aspects of the invention may employ the process shown in FIG. 3 using any arrangement of hosts and devices.

In operation 310, the host interface unit 203 receives data output by the USB system software 202. In the conventional USB system, this data is received by a host controller. The USB host 250 need not have any host controllers, and therefore the host interface unit 203 receives data from the USB system software 202, in contrast with the conventional USB system in which a host controller receives the data.

The data transmitted by the USB system software 202 to the host interface unit 203 may be data transmitted and received between the USB system software 202 of the USB host 250 and the USB logical device 210 of the USB device 250, that is, setup data, or data defined in a USB class specification, that is, data transmitted and received between the client software of the USB host 250 and the function 211 of the USB device 280. The data transmitted by the USB system software 202 to the host interface unit 203 may also be information indicating that the USB host 250 is in a suspended state or data including information used to reset the USB device 280.

In operation 320, the host interface unit 203 generates a payload of a packet to be transmitted via a network, using data received from the USB system software 202. The payload may include information about a transmission type, the address of an endpoint, information about a transmission direction, an address of a device, etc.

In operation 330, the network protocol unit 205 of the USB host 250 generates a packet having a format used in the network. In operation 340, the network protocol unit 205 of the USB host 250 transmits the generated packet to the USB device according to a network protocol.

FIG. 4 is a flowchart of a process in which the USB host 250 receives data from the USB device 280, according to an embodiment of the present invention. In operation 410, the network protocol unit 205 of the USB host 250 receives a packet from the USB device 280 via the network and transmits a payload of the received packet to the host interface unit 202.

In operation 420, the host interface unit 203 analyzes the payload of the received packet and extracts data from the payload recognizable to the USB system software 202. The extracted data may be the data transmitted and received between the USB system software 202 of the USB host 250 and the USB logical device 210 of the USB device 280, that is, setup data, or data defined in a USB class specification, that is, data transmitted and received between the client software 201 of the USB host 250 and the function 211 of the USB device 280.

The payload of the received packet may further include information indicating a success or failure of reception of a packet transmitted to the USB device 280, in addition to information about a transmission type, the address of an endpoint, information about a transmission direction, an address of a device, etc. In operation 430, the host interface unit 203 transmits the extracted data to the USB system software 202.

Figure 5:
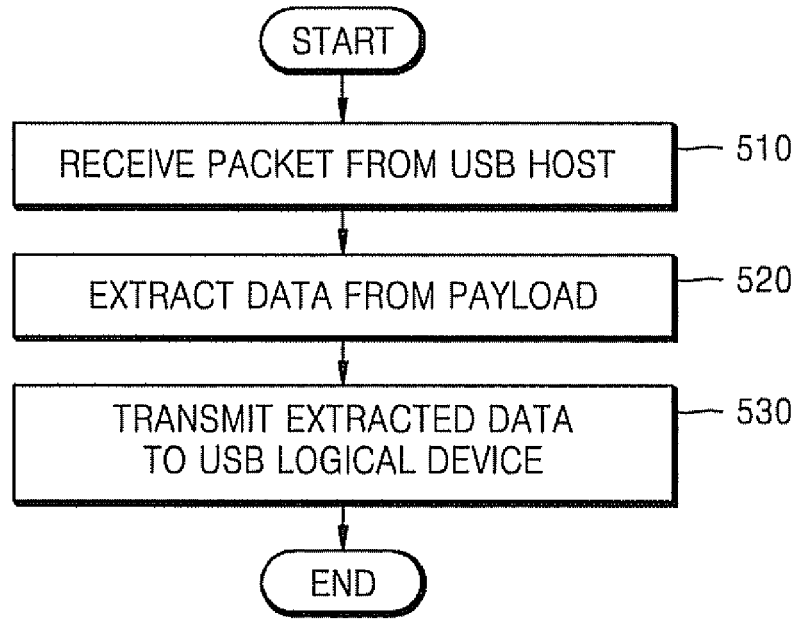
FIG. 5 is a flowchart of a process in which a USB device receives data from a USB host, according to an embodiment of the present invention.

FIG. 5 is a flowchart of a process in which the USB device 280 receives data from the USB host 250, according to an embodiment of the present invention. In operation 510, the network protocol unit 207 included in the USB device 280 receives a packet from the USB host 250 via the network and transmits a payload of the packet to the device interface unit 209 included in the USB device 280.

In operation 520, the device interface unit 209 analyzes the payload of the packet and extracts data from the payload recognizable to the USB logical device 210. In operation 530, the device interface unit 209 transmits the extracted data to the USB logical device 210.

Figure 6:
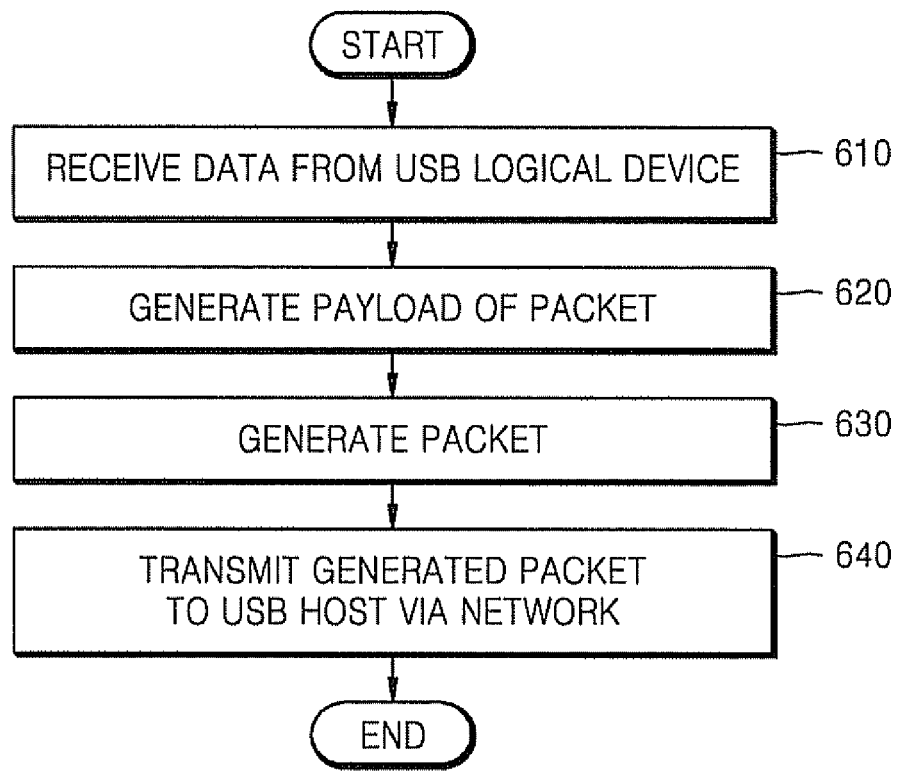
FIG. 6 is a flowchart of a process in which a USB device transmits data to a USB host, according to an embodiment of the present invention.

FIG. 6 is a flowchart of a process in which the USB device 280 transmits data to the USB host 250, according to an embodiment of the present invention. In operation 610, the device interface unit 209 receives data that the USB logical device 210 transmits to a USB bus interface in a conventional USB system. The USB device 280 need not have any USB bus interfaces, and therefore the device interface unit 209 receives data from the USB logical device 210, in contrast with the conventional USB system in which the USB bus interface receives the data.

In operation 620, the device interface unit 209 generates a payload of a network packet to be transmitted to the USB host 250 using received data. The payload may include, for example, information about a transmission type, the address of an endpoint, information about a transmission direction, an address of a device, or information indicating a success or failure of reception of a previous packet by the USB device 280.

In operation 630, the network protocol unit 207 of the USB device 280 generates a packet having a format that is used in the network. In operation 640, the network protocol unit 207 of the USB device 280 transmits the generated packet to the USB host 250 via the network.

Figure 7:
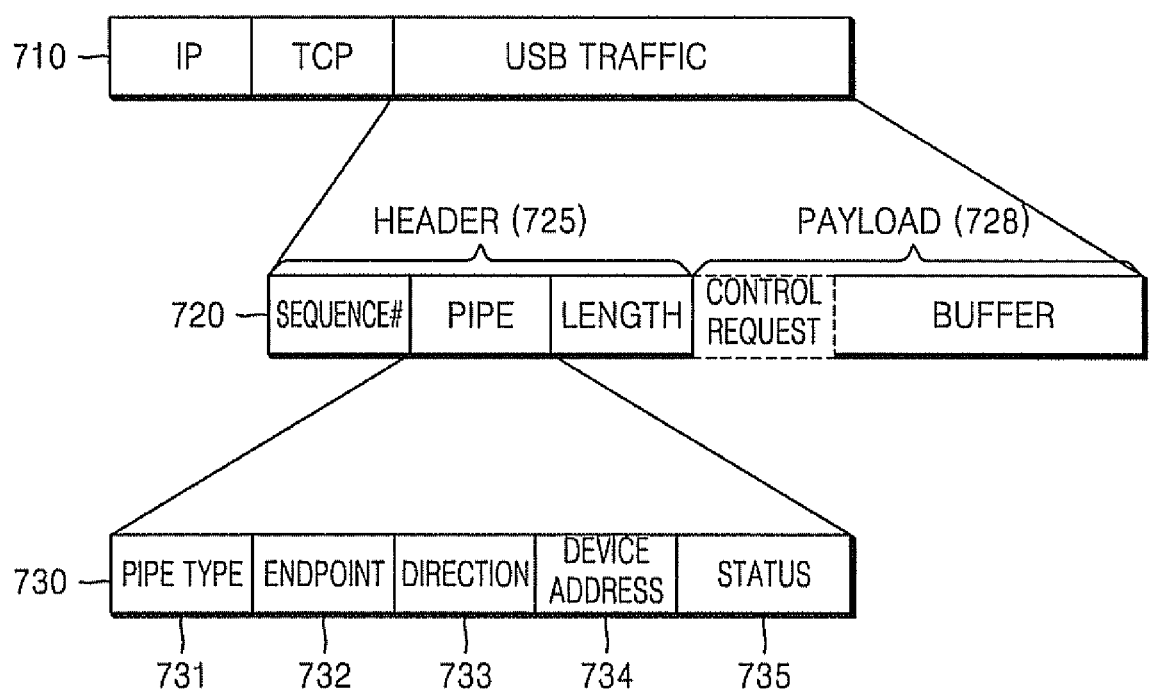
FIG. 7 illustrates a structure of a packet transmitted between a USB device and a USB host according to an embodiment of the present invention.

FIG. 7 illustrates a structure of a packet transmitted between the USB device 280 and the USB host 250 according to an embodiment of the present invention. The packet is assumed to be transmitted using the Transmission Control Protocol/Internet Protocol (TCP/IP) standard via the Ethernet; however, the packet may also be transmitted using any protocol, such as the User Datagram Protocol (UDP). A payload 720 of a packet 710 is USB traffic data. The payload 720 includes a header 725 and a payload 728. The payload 720 of the packet 710 has a format that can be processed by the host interface unit of the USB host and the device interface unit of the USB device. In the present embodiment, the header 725 includes a field representing a sequence number, a field representing pipe information, and a field representing the length of the payload 728. A control request field of the payload 728 stores setup data. A buffer field of the payload 728 stores data other than the setup data. Other arrangements of information in the packet 710 are also possible.

A field 730, namely, the field representing pipe information, includes information 731 about a transmission type, an address 732 of an endpoint, information 733 about a transmission direction, a device address 734, and status information 735 indicating a success or failure of reception of a packet.

According to aspects of the present invention, a USB device can be connected to a USB host via a network even without a USB cable, and thus is not affected by a restriction of the distance between the USB host and USB device. Moreover, the USB host may use the client software and USB system software of a conventional USB system without any changes thereto, and the USB device may use the function or USB Logical Device of the conventional USB system without any changes thereto.

USB communication techniques according to aspects of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CDs and DVDs; magneto-optical media such as optical disks; and hardware devices that are specially configured to store and perform program instructions, such as read-only memory (ROM), random access memory (RAM), flash memory, and the like. The computer readable recording medium can also be distributed over network coupled computer systems so that the computer readable code is stored and executed in a distributed fashion. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method in which a USB (universal serial bus) host communicates with a USB device, the method comprising:
    generating a packet having a format that is used in a network other than a USB network, using data output by USB system software; and
    transmitting the generated packet to a network protocol unit of the USB device using a network protocol unit of the USB host, via the network,
    wherein the USB host and the USB device do not include a USB bus interface and do not include a host controller, and the communication between the USB host and the USB device is performed without using a USB bus interface and a host controller.

2. The method of claim 1, wherein the data is at least one of setup data or data transmitted by client software of the USB host to a function of the USB device.

3. The method of claim 1, wherein the packet comprises at least one of information about a transmission type, an address of an endpoint, information about a transmission direction, and a device address.

4. The method of claim 1, wherein the data comprises at least one of information indicating that the USB host is in a suspended state or information used to reset the USB device.

5. The method of claim 1, wherein the network is at least one of a wireless LAN, an Ethernet, and a token ring.

6. A computer readable recording medium having recorded thereon a program to execute the method of claim 1.

7. A method in which a USB host communicates with a USB device, the method comprising:
    receiving a packet that is used in a network other than a USB network using a network protocol unit of the USB host, from a network protocol unit of the USB device, via the network;
    extracting data recognizable to USB system software from the received packet; and
    transmitting the extracted data to the USB system software, wherein the USB host and the USB device do not include a USB bus interface and do not include a host controller, and the communication between the USB host and the USB device is performed without using a USB bus interface and a host controller.

8. The method of claim 7, wherein the data is at least one of setup data or data transmitted by a function of the USB device to client software of the USB host.

9. The method of claim 7, wherein the packet comprises at least one of information about a transmission type, an address of an endpoint, information about a transmission direction, a device address, and information indicating a success or failure of reception of the packet by the USB device.

10. The method of claim 7, wherein the network is at least one of a wireless LAN, an Ethernet, and a token ring.

11. A computer readable recording medium having recorded thereon a program to execute the method of claim 7.

12. A USB host to communicate with a USB device, the USB host comprising:
a network protocol unit to transmit and receive a packet to and from a network protocol unit of a USB device, via a network other than a USB network; and
a host interface unit to generate a payload of a packet to be transmitted to the network protocol unit of the USB device by the network protocol unit of the USB host, using data output by USB system software, to extract data recognizable to the USB system software from the payload of a packet received by the network protocol unit of the USB host, and to transmit the extracted data to the USB system software,
wherein the USB host and the USB device do not include a USB bus interface and do not include a host controller, and the communication between the USB host and the USB device is performed without using a USB bus interface and a host controller.

13. The USB host of claim 12, wherein the data is at least one of setup data or data transmitted and received between client software of the USB host and a function of the USB device.

14. The USB host of claim 12, wherein the packet comprises at least one of information about a transmission type, an address of an endpoint, information about a transmission direction, a device address, and information indicating a success or failure of reception of the packet by the USB device.

15. The USB host of claim 12, wherein the data comprises at least one of information indicating that the USB host is in a suspended state or information used to reset the USB device.

16. The USB host of claim 12, wherein the network is at least one of a wireless LAN, an Ethernet, and a token ring.

17. A method in which a USB device communicates with a USB host, the method comprising:
generating a packet having a format that is used in a network other than a USB network, using data output by a USB logical device; and
transmitting the generated packet from a network protocol unit of the USB device to a network protocol unit of the USB host, via the network,
wherein the USB host and the USB device do not include a USB bus interface and do not include a host controller, and the communication between the USB host and the USB device is performed without using a USB bus interface and a host controller.

18. The method of claim 17, wherein the data is at least one of setup data or data transmitted by a function of the USB device to client software of the USB host.

19. The method of claim 17, wherein the packet comprises at least one of information about a transmission type, an address of an endpoint, information about a transmission direction, a device address, and information indicating a success or failure of reception of the packet by the USB device.

20. The method of claim 17, wherein the network is at least one of a wireless LAN, an Ethernet, and a token ring.

21. A computer readable recording medium having recorded thereon a program to execute the method of claim 17.

22. A method in which a USB device communicates with a USB host, the method comprising:
receiving a packet that is used in a network other than a USB network, at a network protocol unit of the USB device, from a network protocol unit of the USB host, via the network;
extracting data from the received packet recognizable to a USB logical device; and
transmitting the extracted data to the USB logical device,
wherein the USB host and the USB device do not include a USB bus interface and do not include a host controller, and the communication between the USB host and the USB device is performed without using a USB bus interface and a host controller.

23. The method of claim 22, wherein the data is at least one of setup data or data transmitted by client software of the USB host to a function of the USB device.

24. The method of claim 22, wherein the packet comprises at least one of information about a transmission type, an address of an endpoint, information about a transmission direction, and a device address.

25. The method of claim 22, wherein the data comprises at least one of information indicating that the USB host is in a suspended state or information used to reset the USB device.

26. The method of claim 22, wherein the network is at least one of a wireless LAN, an Ethernet, and a token ring.

27. A computer readable recording medium having recorded thereon a program to execute the method of claim 22.

28. A USB device to communicate with a USB host, the USB device comprising:
a network protocol unit to transmit and receive a packet to and from a network protocol unit of the USB host via a network other than a USB network; and
a device interface unit to generate a payload of a packet to be transmitted by the network protocol unit using data output by a USB logical device, to extract data recognizable to the USB logical device from the payload of a packet received by the network protocol unit, and to transmit the extracted data to the USB logical device via the network protocol device,
wherein the USB host and the USB device do not include a USB bus interface and do not include a host controller, and the communication between the USB host and the USB device is performed without using a USB bus interface and a host controller.

* * * * *